US006802781B2

(12) United States Patent
Schwärzler et al.

(10) Patent No.: US 6,802,781 B2
(45) Date of Patent: Oct. 12, 2004

(54) LONGITUDINAL PLUNGING UNIT HAVING A MATERIAL WITH A UNIFORM WALL THICKNESS

(75) Inventors: Peter Schwärzler, Glattbach (DE); Herbert Cermak, Bessenbach (DE); Arne Berger, Much (DE)

(73) Assignee: GKN Löbro GmbH (DE)

( * ) Notice: Subject to any disclaimer, the term of this patent is extended or adjusted under 35 U.S.C. 154(b) by 0 days.

(21) Appl. No.: 10/303,499

(22) Filed: Nov. 25, 2002

(65) Prior Publication Data

US 2003/0100377 A1 May 29, 2003

(30) Foreign Application Priority Data

Nov. 29, 2001 (DE) ......................................... 101 58 544

(51) Int. Cl.[7] ............................. F16D 3/06; F16C 3/035
(52) U.S. Cl. ......................................... 464/167; 384/49
(58) Field of Search ............................... 464/167, 146, 464/906, 162; 384/49

(56) References Cited

U.S. PATENT DOCUMENTS

| | | | | |
|---|---|---|---|---|
| 754,066 A | * | 3/1904 | Hoffmann | 464/167 |
| 3,012,421 A | * | 12/1961 | Cull | 464/89 |
| 3,656,318 A | * | 4/1972 | Smith et al. | 464/146 |
| 3,797,276 A | * | 3/1974 | Orain | 464/167 |
| 3,817,057 A | * | 6/1974 | Orain | 464/89 |
| 4,705,491 A | * | 11/1987 | Andersson | 464/167 |
| 5,584,765 A | * | 12/1996 | Ochiai | 464/168 |
| 6,293,872 B1 | | 9/2001 | Ganser | |

FOREIGN PATENT DOCUMENTS

| | | |
|---|---|---|
| DE | 37 30 393 A1 | 3/1989 |
| DE | 44 19 373 C2 | 1/1998 |
| DE | 198 24 477 A1 | 12/1999 |
| DE | 196 09 423 C2 | 7/2000 |

* cited by examiner

Primary Examiner—David Bagnell
Assistant Examiner—K. Thompson (57) ABSTRACT

A longitudinal plunging unit (11) for torque transmitting purposes in a shaft assembly, comprising an outer profiled sleeve (21) having circumferentially distributed, inner, longitudinally extending first ball grooves (22) to be connected to a first attachment part, a profiled journal (31) positioned inside the outer profiled sleeve (21) and having circumferentially distributed, outer, longitudinally extending second ball grooves (32) to be connected to a second attachment part, groups of balls (41) arranged in pairs of first and second ball grooves (22, 32), and a sleeve-shaped ball cage (42) which is positioned in the annular space between the profiled sleeve (21) and the profiled journal (31) and which fixes the groups of balls (41) in their respective positions relative to one another. The profiled sleeve (21) comprises a material with a substantially uniform wall thickness with a maximum deviation in wall thickness of ±15% and, in the region adjoining the first ball grooves (22), towards the first attachment part, changes integrally into a first cylindrical projection (23) and, in the region adjoining the first ball grooves (22), towards the second attachment part, changes integrally into a second cylindrical projection (25).

20 Claims, 10 Drawing Sheets

LONGITUDINAL PLUNGING UNIT HAVING A MATERIAL WITH A UNIFORM WALL THICKNESS

TECHNICAL FIELD

The invention relates to a longitudinal plunging unit for torque transmitting purposes in a shaft assembly. The unit includes an outer profiled sleeve having circumferentially distributed, inner, longitudinally extending first ball grooves to be connected to a first attachment part, a profiled journal positioned inside the outer profiled sleeve and having circumferentially distributed, outer, longitudinally extending second ball grooves to be connected to a second attachment part, groups of balls arranged in pairs of first and second ball grooves, and a sleeve-shaped ball cage which is positioned in the annular space between the profiled sleeve and the profiled journal and which fixes the groups of balls in their respective positions relative to one another.

BACKGROUND OF THE INVENTION

Such axial plunging units serve the transmission of torque in shaft assemblies which, when in operation, are subject to changes in length. These changes in length, in a motor vehicle, for example, are caused by movements of one of the attachment parts due to compression and rebound actions. To the extent that reference is made to shaft assemblies, it is also possible for the latter to be formed largely by the longitudinal plunging unit itself which is then directly connected to attachment pieces such as welded-on flanges and slipped-on hubs.

When a profiled sleeve is displaced relative to a profiled journal while under torque, the rolling movement of the balls in the inner and outer ball grooves is substantially free from any sliding friction, so that the balls and thus the ball cage with all the balls cover half the relative plunging distance between the two parts. This permits the change in length of the longitudinal plunging unit to be of a low-friction nature. At the ends of the plunging path, axial stops for the ball cage or for the balls have to be provided in the profiled sleeve or on the profiled journal. Under normal operating conditions, the ball cage should preferably not reach the axial stops, but it should be freely displaceable on the plunging path specified by the design, thus avoiding any sliding friction of the balls in the grooves.

Assemblies of this type are used in torque-transmitting shafts, especially driveshafts which—for compensating for tolerances in the distance between the attachment parts during assembly and/or for compensating changes in the distances between the attachment parts, such as joints, in operation—require low-friction plunging conditions. When in operation and during the transmission of torque, such driveshafts suffer from a problem in that the inter-engaging portions of the profiled sleeve and of the profiled journal are, by necessity, subject to torsion in the regions of the ball grooves.

As a result of the torsional movements of the profiled sleeve and of the profiled journal during the transmission of torque, there can occur uneven load conditions at the balls in the different cross-sectional planes. This adversely affects smooth and easy movability and can lead to early failure. In order to avoid this, it is desirable for both parts to feature a high degree of stiffness.

SUMMARY OF THE INVENTION

It is therefore an object of the present invention to provide a longitudinal plunging unit of the foregoing type which combines a high degree of strength with a lightweight design.

The present invention provides a profiled sleeve comprising a material with a substantially uniform wall thickness with a maximum deviation in wall thickness of ±15%. The profiled sleeve, in the region adjoining the first ball grooves, towards the first attachment part, changes integrally into a first cylindrical projection and, in the region adjoining the first ball grooves, towards the second attachment part, changes integrally into a second cylindrical projection. The two cylindrical projections mentioned improve the dimensional stiffness of the profiled sleeve. During the production of the profiled sleeve, the two cylindrical projections can be produced particularly easily by being formed out of a tubular member. The first cylindrical projection at the attachment end can be connected in an easy way to an adjoining shaft tube, either via an abutting connection or by being inserted into or slid onto same. The second cylindrical projection at the insertion end, which second cylindrical projection points towards the attachment part of the profiled journal, can be designed as a seal and stop for the balls held in the cage. If the second cylindrical projection has a greater inner diameter than the cross-section of the ball grooves, it is capable of accommodating sealing and stopping means by means of a press fit.

According to a preferred embodiment, the inner diameter of the first cylindrical projection is greater than an enveloping circle around the balls held in a functionally accurate or operationally accurate way in the cage. This allows the ball cage with the balls to be inserted from the attachment end. A stopping mechanism for the cage can then optionally be inserted into the first cylindrical projection, so that the cage cannot be disconnected from the profiled journal inside the profiled sleeve.

The profiled journal is preferably produced in the form of a hollow journal, such as from a material with a substantially uniform wall thickness with a maximum deviation in wall thickness of ±15%. This measure permits the greatest savings in respect of weight and material at the profiled journal, which savings have so far not been possible. In a preferred embodiment, in the region adjoining the second ball grooves, towards the second attachment part, the profiled journal is produced so as to change integrally into a tubular cylindrical portion whose outer diameter substantially corresponds to an enveloping circle around the second profiled grooves.

The profiled sleeve, in the region of the first ball grooves, is preferably provided with a metal armouring which comprises a high wear strength and which, on its own, also comprises a uniform wall thickness.

Both the profiled journal and the profiled sleeve can be produced from a tube by way of deformation, and the profiled sleeve provided with an armouring can be produced from a tube provided with an armouring sleeve which is inserted with a press fit. A radial material pre-tension between the profiled sleeve and the armouring sleeve has a strength-increasing effect. Analogously, the profiled journal can be provided with an armouring in the region of the ball grooves, which armouring can comprise an armouring sleeve which is slid on to a tube and which, together with the tube, is deformed into the profiled journal.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

Figure 1:
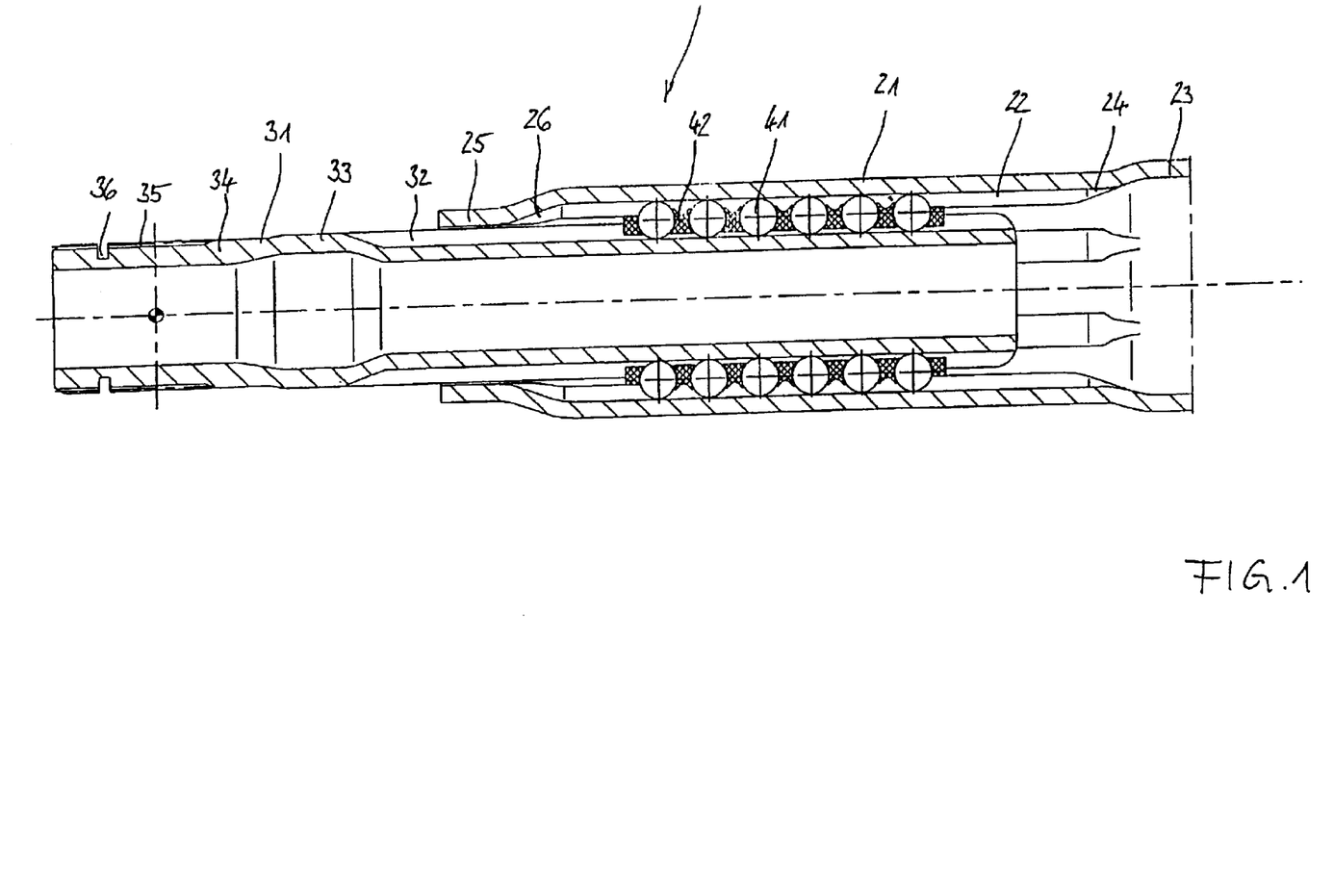
FIG. 1 is a longitudinal section through an axial plunging unit in accordance with the invention, in a first embodiment.
Figure 2:
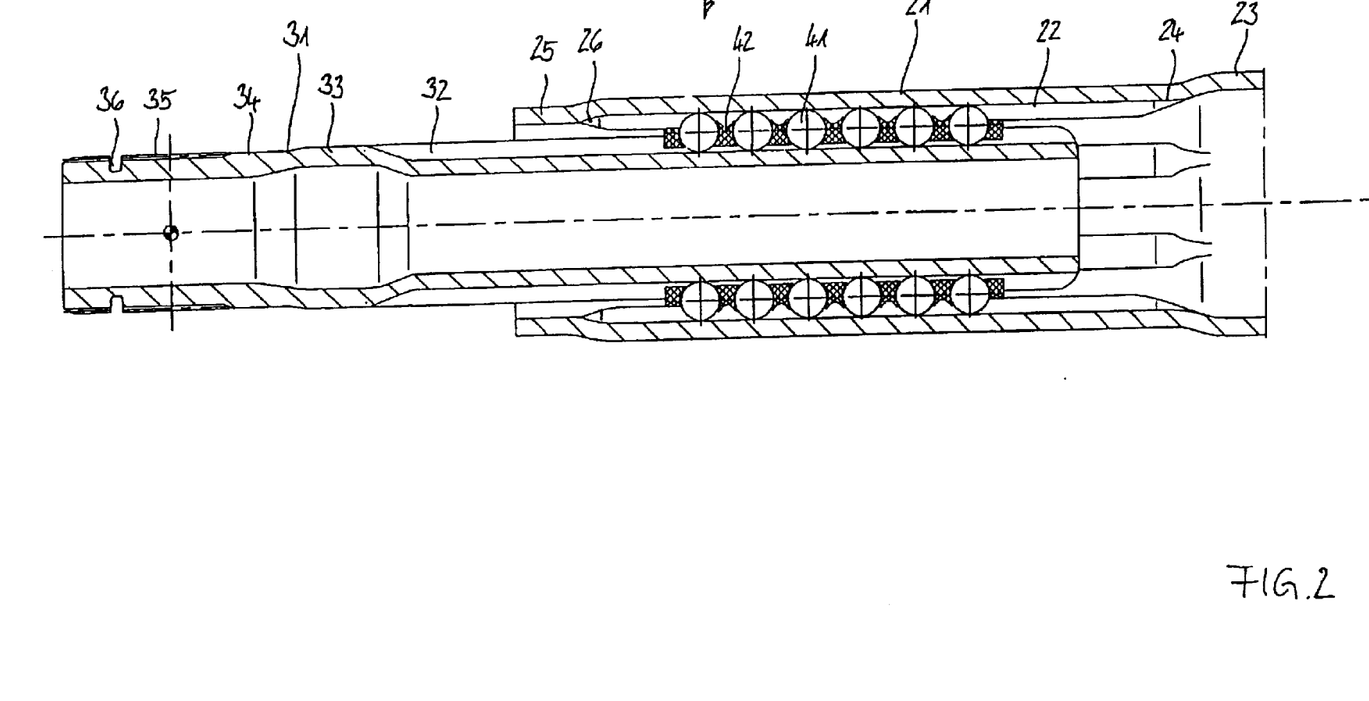
FIG. 2 is a longitudinal section through an axial plunging unit in accordance with the invention, in a second embodiment.

FIGS. 1 and 2 will be described jointly below. They each show a longitudinal section through an inventive axial plunging unit 11 which comprises a profiled sleeve 21, a profiled journal 31, groups of torque transmitting balls 41 and a sleeve-shaped ball cage 42. On the right, the profiled sleeve 21 can be connected to a first attachment part, such as a tubular shaft. On the left, the profiled journal 31 can be connected to a second attachment part, such as a slid-on joint component. The profiled sleeve 21 comprises a material with a substantially uniform wall thickness and, on its inside, comprises longitudinally extending ball grooves 22. At the end of the first attachment part, the profiled sleeve 21 is expanded towards a first cylindrical projection 23 whose inner diameter is greater than an enveloping circle around the ball 41 in its design-related functionally accurate position as held by the cage 42. The ball cage can thus be inserted from the right through the first cylindrical projection 23 into the region of the first ball grooves 22. The cylindrical projection 23 is suitable for connecting an adjoining tubular shaft by but welding or, optionally, for inserting a shaft which can stop at the run-out portions 24 of the ball grooves. Towards the second attachment piece, the profiled sleeve comprises a second cylindrical projection 25 whose inner diameter is reduced relative to the region of the ball grooves 22. The cylindrical projection 25 increases the dimensional stiffness of the profiled tube 21 at its free end. It should be noted at this point that, like the first cylindrical projection 23, the second cylindrical projection 25 can be increased in size relative to the groove portion. This would make it easier to receive sealing means with a sealing function relative to the profiled journal 31.

The profiled journal 31 also comprises a material with a substantially uniform wall thickness and includes second ball grooves 32 on its outside. At the end of the ball groove region, the profiled journal 31 changes into a cylindrical portion 33 whose outer diameter corresponds to an enveloping circle around the second ball grooves 32. Said cylindrical portion 33 is followed by a portion 34 with a greater wall thickness and with splines 35 and with a securing groove 36 whose outer diameter does not exceed that of the cylindrical portion 33. In this way, the profiled journal 31 can be inserted from both directions into the profiled sleeve 21. At the free end of the ball groove region, the cross-section of the profiled journal 31 is uniform. The specification that the profiled sleeve and the profiled journal should comprise a material with a substantially uniform wall thickness primarily concerns the longitudinal portions of the first ball grooves 22 and of the second ball grooves 32. However, this can also apply to the cylindrical projections 23, 25 and the cylindrical portion 33, but not necessarily to the portion 34 at the profiled journal.

A slight difference between the two embodiments according to FIGS. 1 and 2 is shown wherein, because of a different diameter of the second cylindrical projection 25 in the first embodiment according to FIG. 1, the ball cage 42 will stop at the transition to the second cylindrical projection 25, whereas in the second embodiment according to FIG. 2, the first balls 41 will stop against the ball groove run-out portions 26 at the transition to the second cylindrical projection 25.

Figure 3:
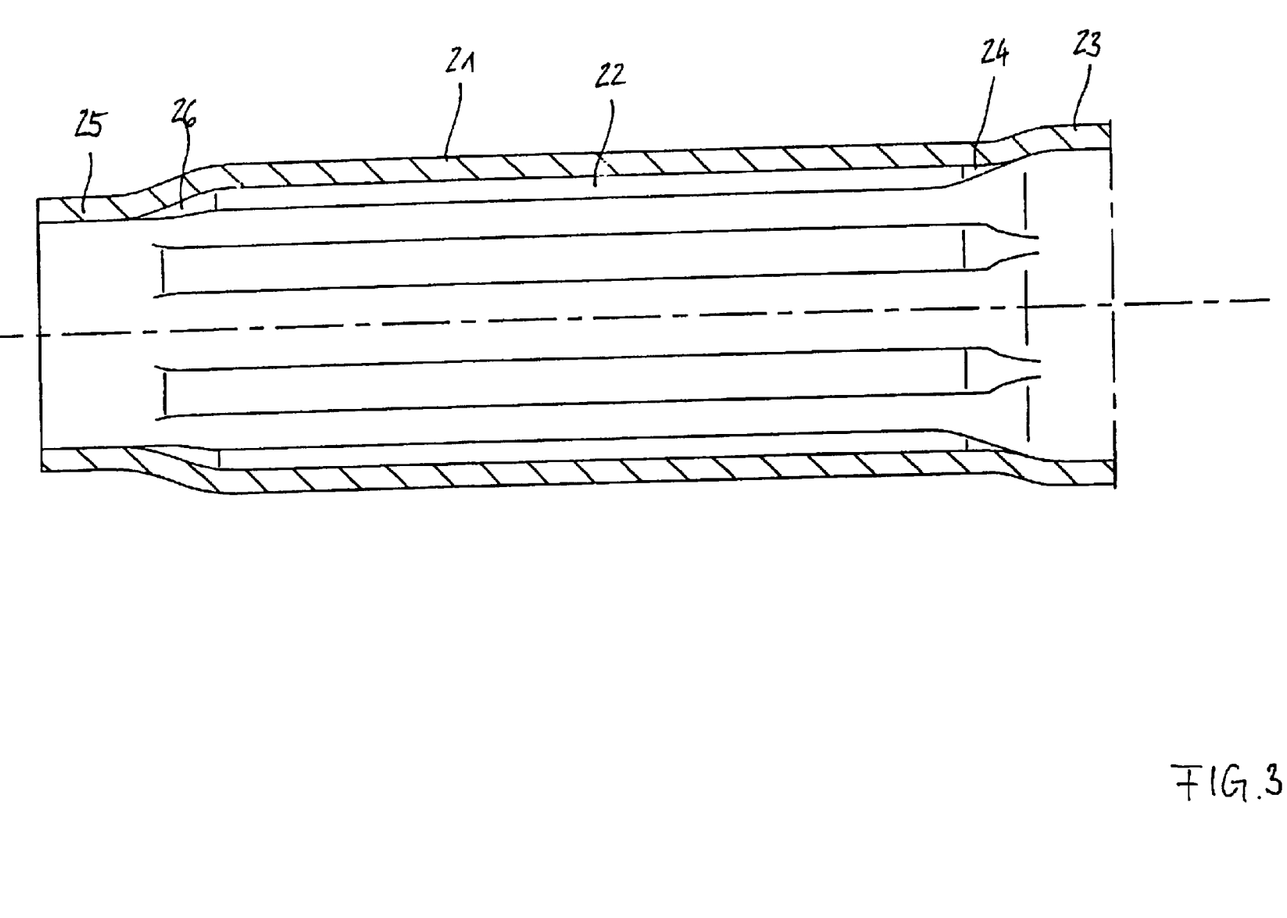
FIG. 3 is a longitudinal section through the profiled sleeve according to FIG. 1 in the form of a detail.

FIG. 3 shows the profiled sleeve 21 according to FIG. 1 in the form of a detail. Identical details have been given the same reference numbers. To that extent, reference is made in full to the description of same.

Figure 4:
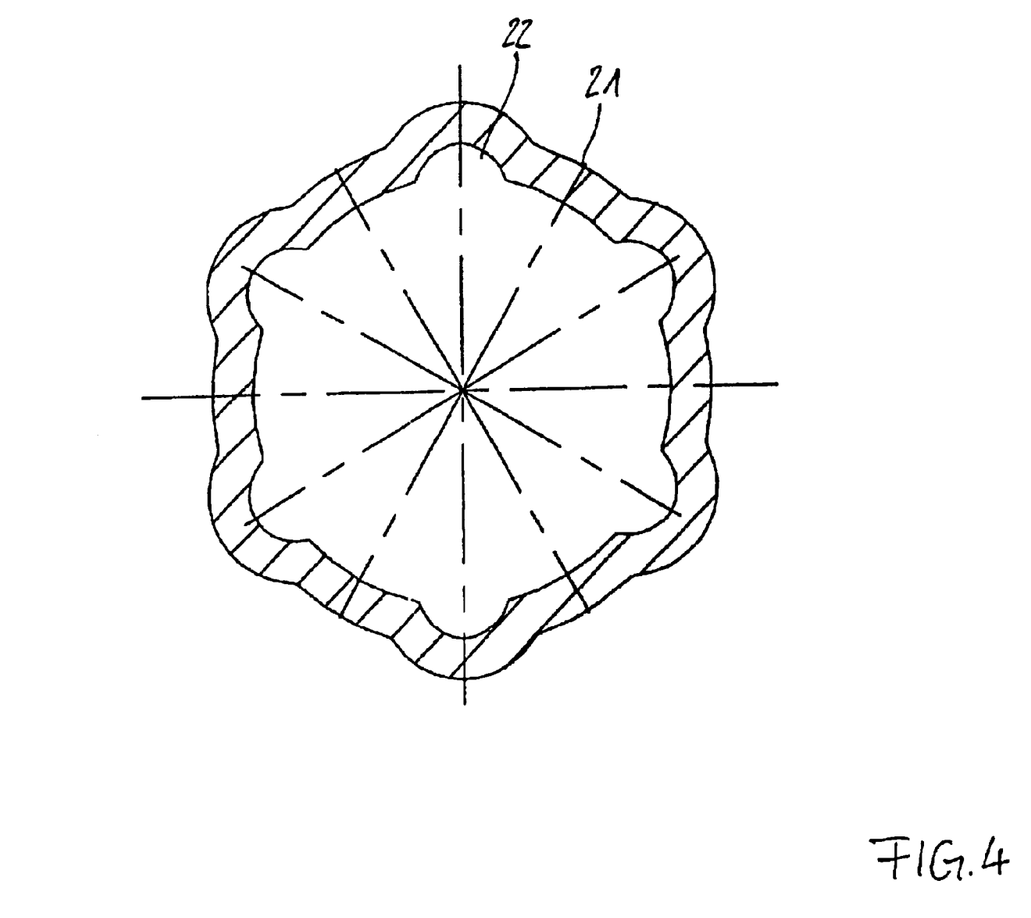
FIG. 4 is a cross-section through the profiled sleeve according to FIG. 3.

FIG. 4 shows the profiled sleeve according to FIG. 3 in a cross-sectional view. It is possible to see a substantially circular basic shape with formed-out ball grooves 22. In particular, this cross-sectional shape can be obtained by forming it out of an originally round tube with a uniform wall thickness. The forming operation can take place by drawing the tube in the longitudinal direction over a mandrel through a die or by continuous hammering over a core. The final wall thickness measured perpendicularly relative to a tangent in each surface point in the cross-section (on the inside or outside) is allowed to fluctuate within the range of ±15% with reference to a mean value.

Figure 5:
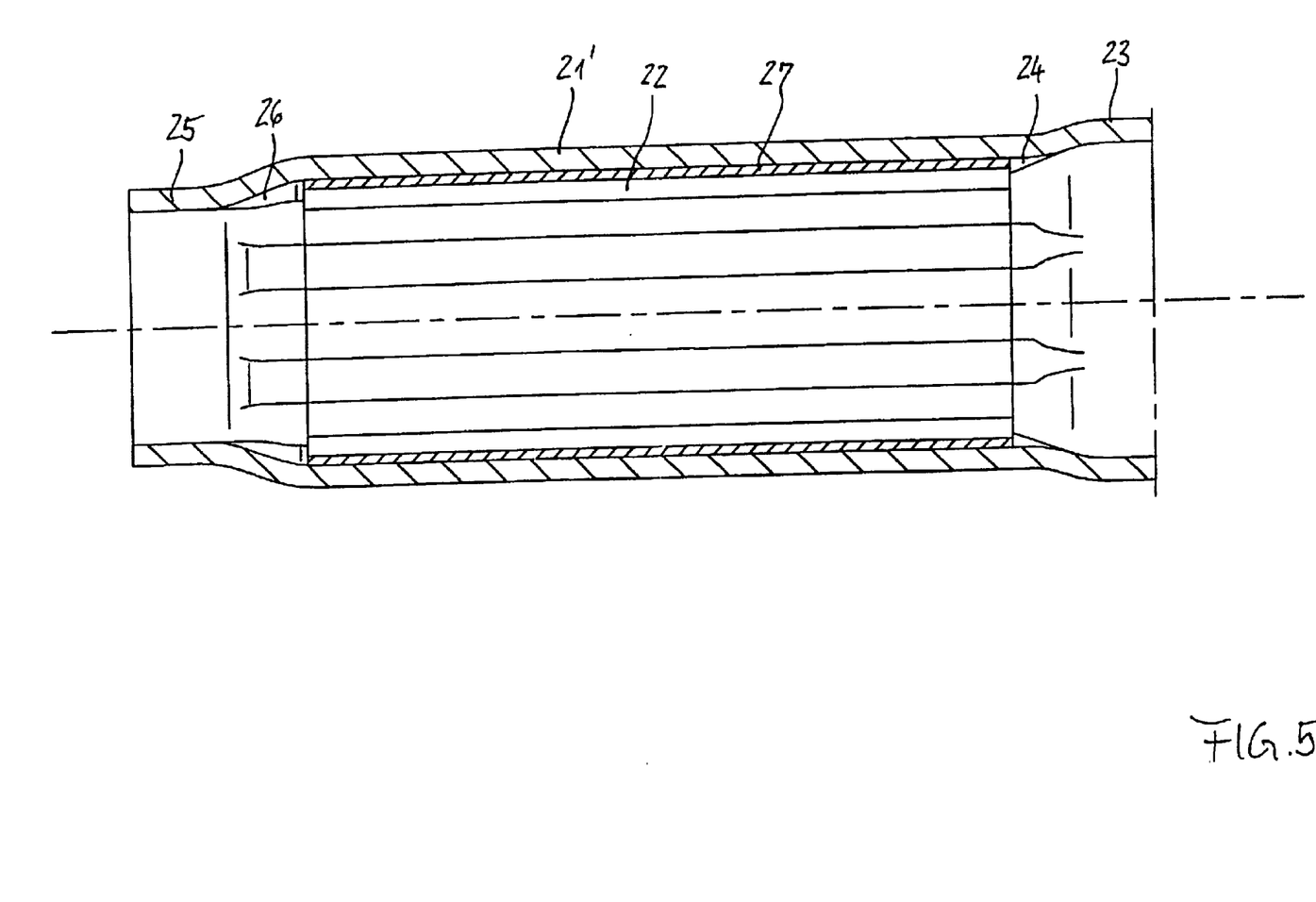
FIG. 5 is a longitudinal section through a profiled sleeve similar to FIG. 3 in a modified embodiment in the form of a detail.

FIG. 5 shows a profiled sleeve 21' in a slightly modified embodiment which is largely identical to that shown in FIG. 3. Identical details have been given the same reference numbers. To that extent, reference is again made to the description of FIG. 1. In the region of the first ball grooves 22, there can be seen an armouring 27 which serves to form wear-resistant running grooves. The armouring is preferably produced from a sleeve which, prior to the forming operation, is slid into a circular tube, held by a press fit and, together with the circular tube, is subjected to one of the above-mentioned forming processes.

Figure 6:
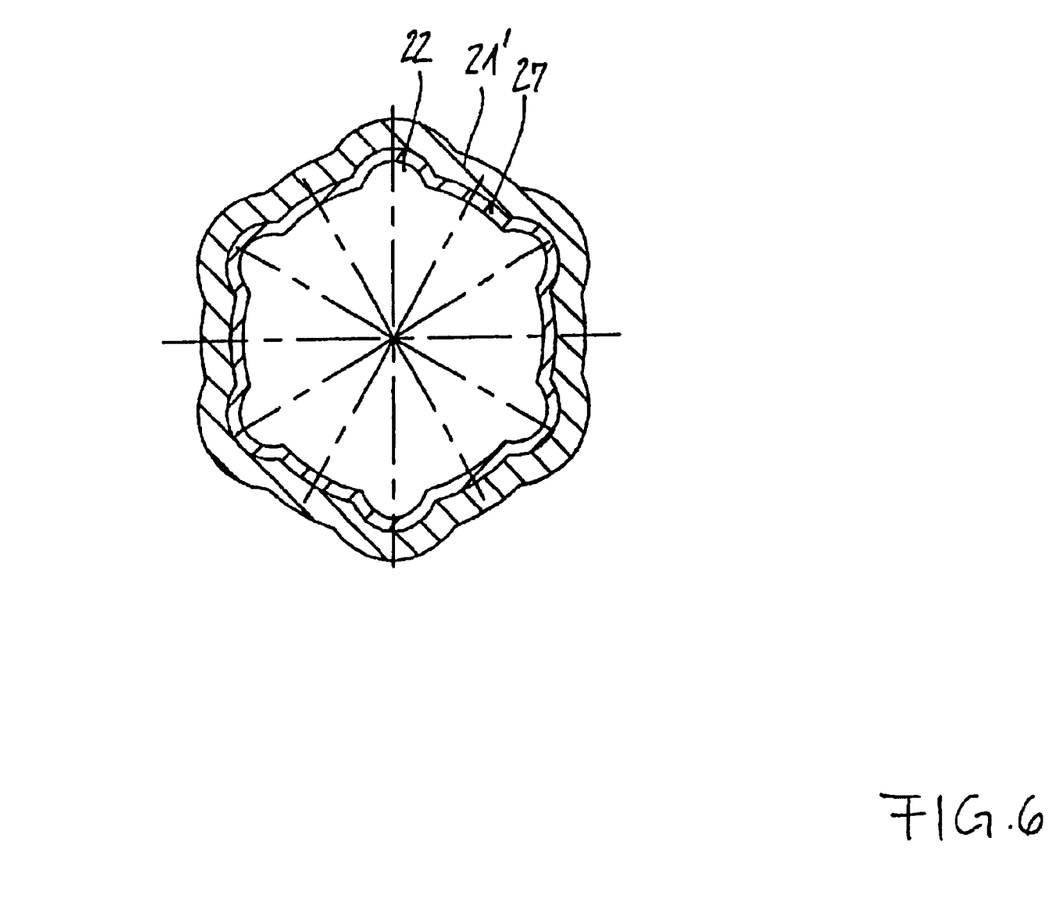
FIG. 6 is a cross-section through the profiled sleeve according to FIG. 5.

FIG. 6 shows the profiled sleeve 21' in a cross-sectional view, and it can be seen that the armouring 27 also has a substantially uniform thickness. The total thickness, again measured perpendicularly relative to tangents in each surface point in the cross-section (on the outside or inside), again should be allowed to vary within the range of ±15% with reference to a mean value.

Figure 7:
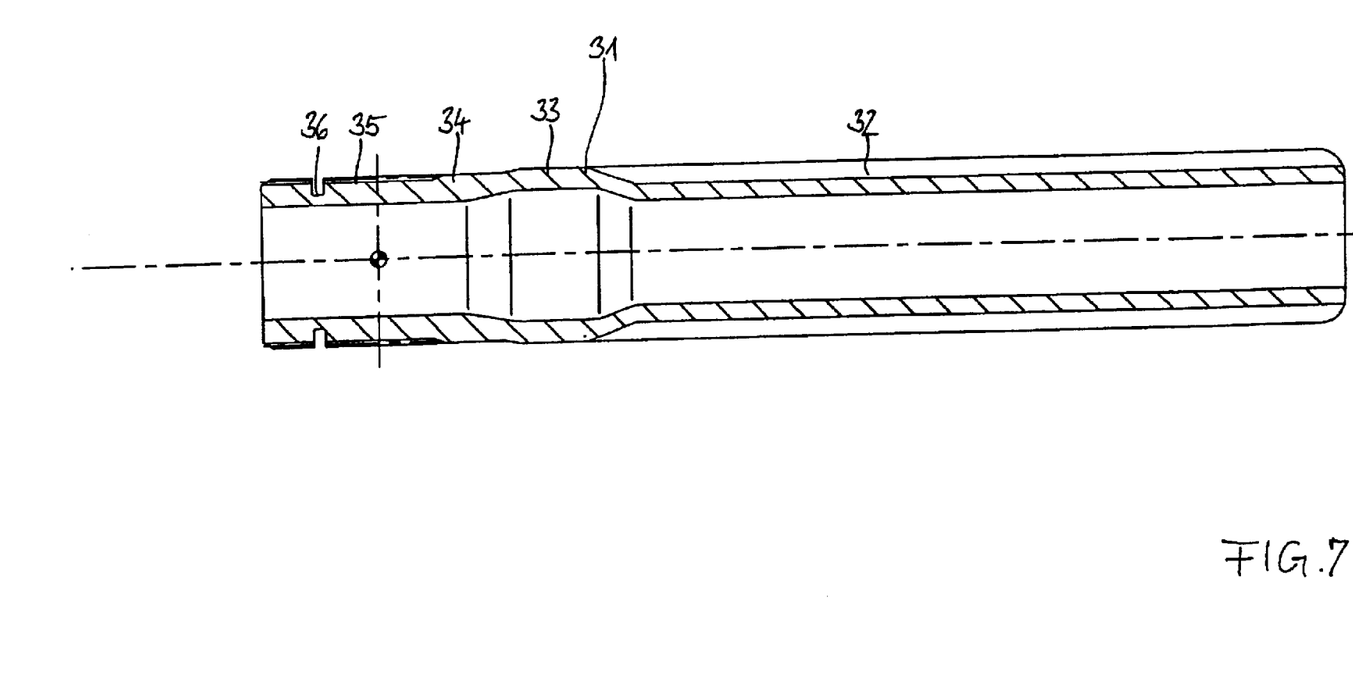
FIG. 7 is a longitudinal section through the profiled journal of the units according to FIGS. 1 and 2 in the form of a detail.

FIG. 7 shows the profiled journal 31 of the unit according to FIGS. 1 and 2 in the form of a detail. Identical details have been given the same reference numbers. To that extent, reference is made to the description of FIGS. 1 and 2.

Figure 8:
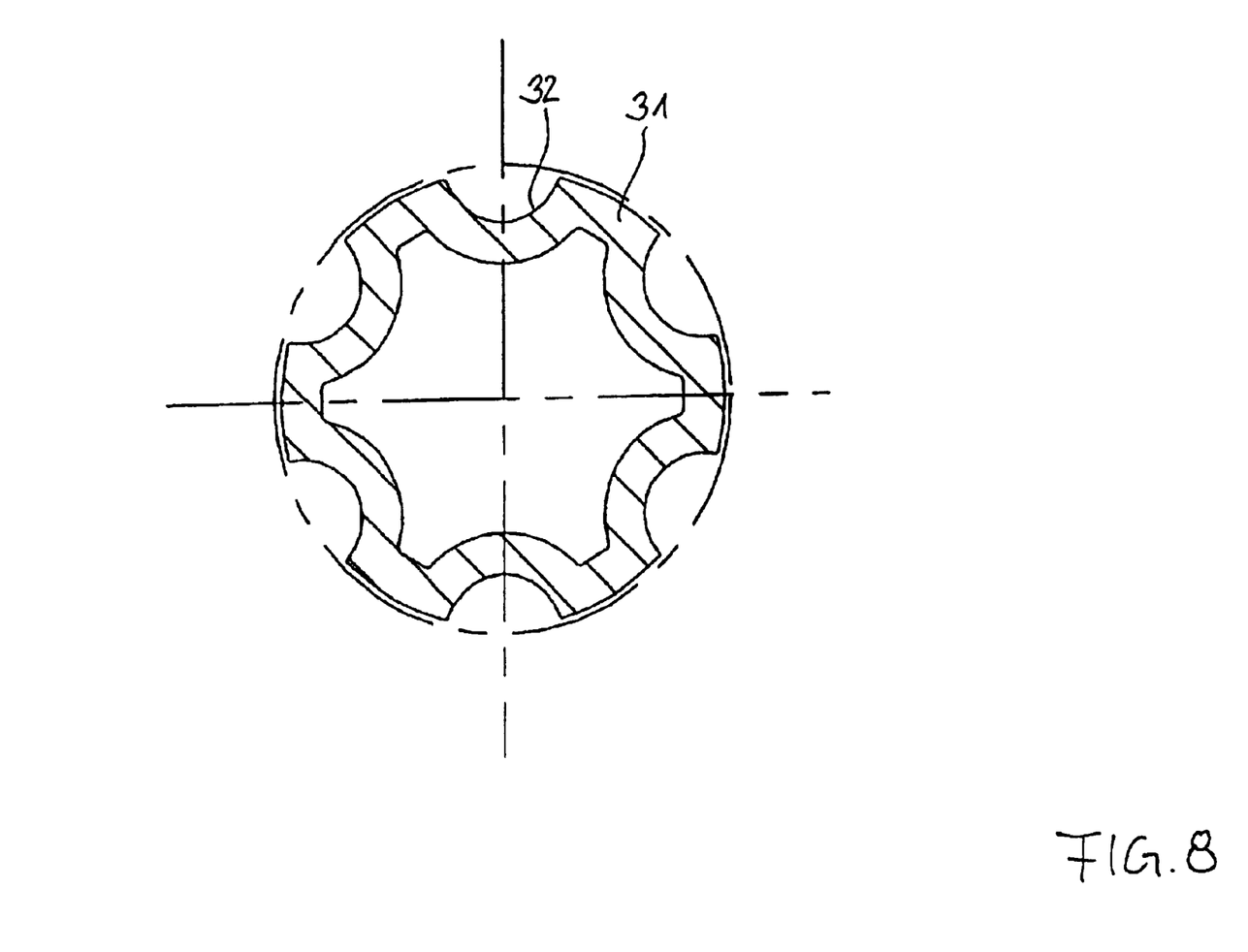
FIG. 8 is a cross-section through the profiled journal according to FIG. 7.

FIG. 8 shows the profiled journal according to FIG. 7 in a cross-sectional view. Again, there is shown a basic shape of a circular tube into which the individual ball grooves 32 have been formed. Again, the preferred method of production is deforming a circular tube by drawing or round hammering. In this case, too, the uniform wall thickness described in connection with the profiled sleeve can be allowed to vary within a range of ±15% with reference to a mean value, in each case measured perpendicularly relative to the wall cross section, as described above.

Figure 9:
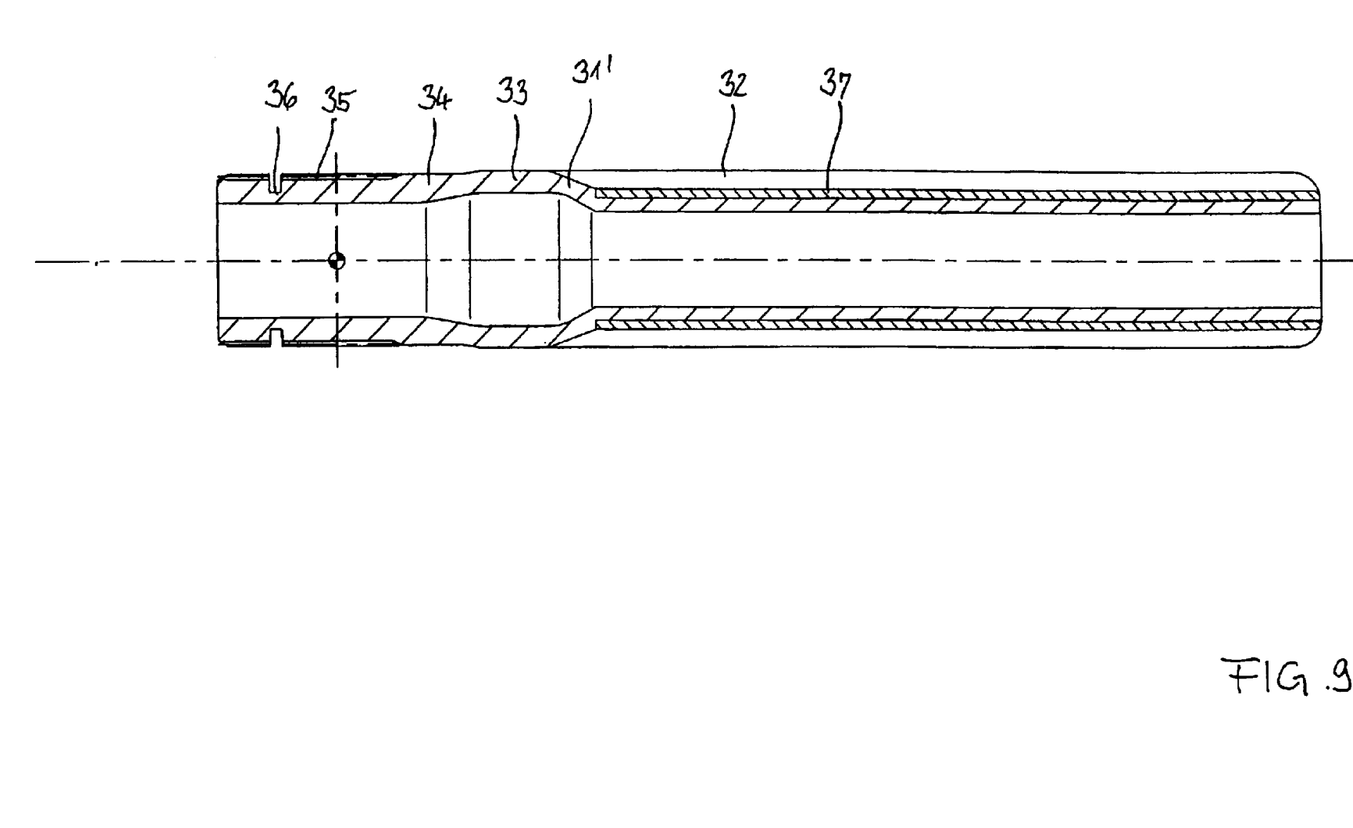
FIG. 9 is a longitudinal section through a profiled journal similar to that of FIG. 7 in modified embodiment in the form of a detail.

FIG. 9 shows a profiled journal 31' in a slightly modified embodiment which largely corresponds to that shown in FIG. 7. Identical details have been given the same reference numbers. To that extent, reference is made to the description of FIGS. 7, 1 and 2. In the region of the second ball grooves 32 it is possible to identify an armouring 37 which serves to form wear-resistant running grooves. The armouring is preferably produced from a sleeve which is slid on to a circular tube, secured by a press-fit and, jointly with the circular tube, is subjected to a deformation process.

Figure 10:
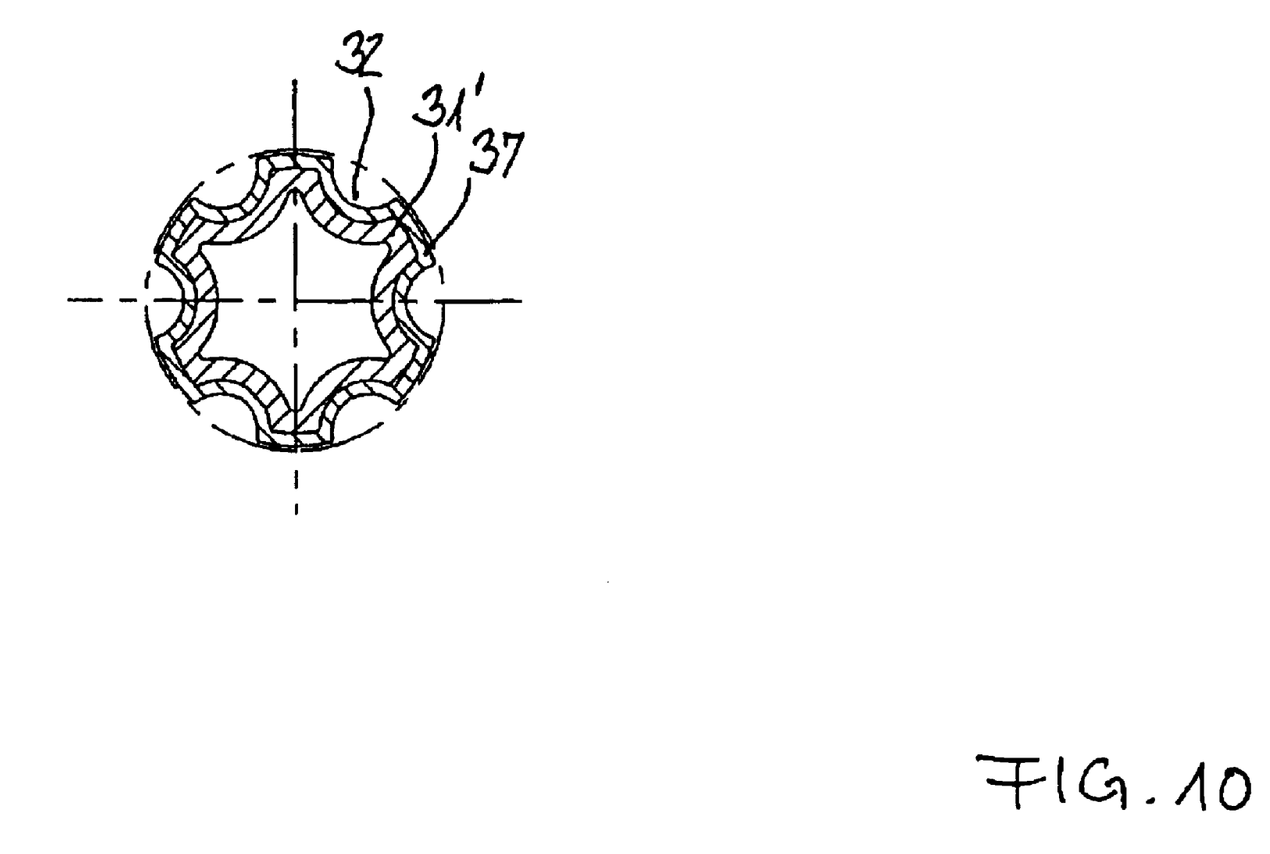
FIG. 10 is a cross-section through the profiled journal according to FIG. 9.

FIG. 10 shows the profiled journal 31' in a cross-sectional view; it also shows the armouring 37 with a substantially uniform wall thickness. The total thickness is again measured perpendicularly to the tangents in each surface point in the cross-section (on the outside or inside) and, in this case, too, it can be allowed to vary within a range of ±15% with reference to a mean value.

From the foregoing, it can be seen that there has been brought to the art a new and improved longitudinal plunging unit having a profiled sleeve with a uniform wall thickness. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A longitudinal plunging unit (11) for torque transmitting purposes in a shaft assembly, comprising:
    an outer profiled sleeve (21) having circumferentially distributed, inner, longitudinally extending first ball grooves (22), said outer profile sleeve adapted tobe connected to a first attachment part;
    a profiled journal (31) positioned inside said outer profiled sleeve (21) and having circumferentlally distributed, outer, longitudinally extending second ball grooves (32), said profiled journal adapted to be connected to a second attachment part;
    groups of balls (41), each arranged in pairs of the first and second ball grooves (22,32); and
    a sleeve-shaped ball cage (42) positioned in an annular space between the profiled sleeve (21) and the profiled journal (31), which is plungeable with respect to the profiled sleeve (21) and the profiled journal (31) respectively and which fixes the groups of balls (41) in their respective positions relative to one another;
    wherein the profiled sleeve (21) comprises a material with a substantially uniform wall thickness with a maximum deviation in wall thickness of ±15% and wherein, in a region adjoining the first ball grooves (22), towards the first attachment part, the profiled sleeve (21) changes integrally into a first cylindrical projection (23) and, in a region adjoining the first ball grooves (22), towards the second attachment part, the profiled sleeve (21) changes integrally into a second cylindrical projection (25).

2. A unit according to claim 1, wherein an inner diameter of the first cylindrical projection (23) is greater than an enveloping circle around the balls (41) held operationally in the cage (42).

3. A unit according to claim 1, wherein an inner diameter of the second cylindrical projection (25) is less than an enveloping circle around the balls (41) held operationally in the cage (42).

4. A unit according to claim 2, wherein an inner diameter of the second cylindrical projection (25) is less than an enveloping circle around the balls (41) held operationally in the cage (42).

5. A unit according to claim 1, wherein art inner diameter of the second cylindrical projection (25) is only insubstantially greater than an enveloping circle around a cross-section of the profiled journal.

6. A unit according to claim 2, wherein an inner diameter of the second cylindrical projection (25) is only insubstantially greater than an enveloping circle around a cross-section of the profiled journal.

7. A unit according to claim 3, wherein the inner diameter of the second cylindrical projection (25) is only insubstantially greater than an enveloping circle around a cross-section of the profiled journal.

8. A unit according to claim 4, wherein the inner diameter of the second cylindrical projection (25) is only insubstantially greater than an enveloping circle around a cross-section of the profiled journal.

9. A unit according to claim 1, wherein the profiled journal (31) is produced in the form of a hollow journal.

10. A unit according to claim 2, wherein the profiled journal (31) is produced in the form of a hollow journal.

11. A unit according to claim 3, wherein the profiled journal (31) is produced in the form of a hollow journal.

12. A unit according to claim 5, wherein the profiled journal (31) is produced in the form of a hollow journal.

13. A unit according to claim 1, wherein in a region adjoining the second ball grooves (32), towards the second attachment part, the profiled journal (31) changes integrally into a cylindrical portion (33).

14. A unit according to claim 2, wherein in a region adjoining the second ball grooves (32), towards the second attachment part, the profiled journal (31) changes integrally into a cylindrical portion (33).

15. A unit according to claim 3, wherein in a region adjoining the second ball grooves (32), towards the second attachment part, the profiled journal (31) changes integrally into a cylindrical portion (33).

16. A unit according to claim 5, wherein in a region adjoining the second ball grooves (32), towards the second attachment part, the profiled journal (31) changes integrally into a tubular cylindrical portion (33).

17. A unit according to claim 13, wherein an outer diameter of the cylindrical portion (33) is approximately the same size as an enveloping circle around a cross-section of the profiled journal.

18. A unit according to claim 1, wherein at least one of the profiled sleeve (21) and the profiled journal (31) comprises a two-layer material having an armouring (27) with a high wear strength for the respective ball grooves (22, 32).

19. A longitudinal plunging unit (11) for torque transmitting purposes in a shaft assembly, comprising:
    an outer profiled sleeve (21) having circumferentially distributed, inner, longitudinally extending first ball grooves (22), said outer profile sleeve adapted to be connected to a first attachment part;
    a profiled journal (31) positioned inside said outer profiled sleeve (21) and having circumferentially distributed, outer, longitudinally extending second ball grooves (32), said profiled journal adapted to be connected to a second attachment part;

groups of balls (41), each arranged in pairs of the first and second ball grooves (22,32); and a sleeve-shaped ball cage (42) positioned in an annular space between the profiled sleeve (21) and the profiled journal (31) which is plungeable with respect to the profiled sleeve (21) and the profiled journal (31) respectively and which fixes the groups of balls (41) in their respective positions relative to one another;

wherein the profiled sleeve (21) comprises a material with a substantially uniform wall thickness with a maximum deviation in wall thickness of ±15% and wherein, in a region adjoining the first ball grooves (22), towards the first attachment part, the profiled sleeve (21) changes integrally into a first cylindrical projection (23) and, in a region adjoining the first ball grooves (22), towards the second attachment part, the profiled sleeve (21) changes integrally into a second cylindrical projection (25); and wherein in a region adjoining the second ball grooves (32), towards the second attachment part, the profiled journal (31) changes integrally into a cylindrical portion (33);

wherein the profiled sleeve (21) comprises a two-layer material having an armouring (27) with a high wear strength for the first ball grooves (22).

20. A unit according to claim 19 wherein the profiled journal (31) comprises a two-layer material having an armouring (27) with a high wear strength for the second ball grooves (32).

* * * * *